US012656358B2

(12) United States Patent
Boyes et al.

(10) Patent No.: US 12,656,358 B2
(45) Date of Patent: Jun. 16, 2026

(54) SLIDE OUTPUT MODULE

(71) Applicant: LEICA BIOSYSTEMS MELBOURNE PTY LTD, Mt Waverley (AU)

(72) Inventors: Gregory William Boyes, Melbourne (AU); Nicolas Guiraldenq, Melbourne (AU); Brenden Anthony Shawcroft, Melbourne (AU)

(73) Assignee: LEICA BIOSYSTEMS MELBOURNE PTY LTD, Mt Waverley (AU)

( * ) Notice: Subject to any disclaimer, the term of this patent is extended or adjusted under 35 U.S.C. 154(b) by 1228 days.

(21) Appl. No.: 17/278,995

(22) PCT Filed: Dec. 19, 2019

(86) PCT No.: PCT/AU2019/051409
§ 371 (c)(1),
(2) Date: Mar. 23, 2021

(87) PCT Pub. No.: WO2020/124156
PCT Pub. Date: Jun. 25, 2020

(65) Prior Publication Data
US 2022/0034916 A1      Feb. 3, 2022

(30) Foreign Application Priority Data
Dec. 20, 2018    (AU) ................................ 2018904850

(51) Int. Cl.
*G01N 35/00*        (2006.01)
*B01L 9/00*        (2006.01)
(Continued)

(52) U.S. Cl.
CPC ........ *G01N 35/00029* (2013.01); *B01L 9/523* (2013.01); *G01N 1/312* (2013.01);
(Continued)

(58) Field of Classification Search
CPC ...... B01L 9/52; B01L 9/523; B01L 2200/087; B01L 2200/142; B01L 2300/043;
(Continued)

(56) References Cited

U.S. PATENT DOCUMENTS 3,649,100 A *  3/1972  Kirst ...................... G02B 27/28
                                                      359/398
2005/0281711 A1   12/2005  Testa et al.
(Continued)

FOREIGN PATENT DOCUMENTS

| CN | 104502171 A | 4/2015 |
|----|-------------|--------|
| JP | 2007517509 A | 7/2007 |
| JP | 2013-513782 A | 4/2013 |

OTHER PUBLICATIONS

Extended European Search Report issued Nov. 17, 2021 in European Application No. 19898905.5.
(Continued)

*Primary Examiner* — Elizabeth A Robinson
*Assistant Examiner* — Austin Q Le
(74) *Attorney, Agent, or Firm* — Kinney & Lange, P.A.

(57) ABSTRACT

A slide output module for an automated treatment apparatus for treating tissue samples disposed on slides, the slide output module comprising: a slide output tray assembly comprising a slide output tray adjacent to a slide output cover forming one or more voids between the slide output tray and the slide output tray cover for receiving slides therein, wherein the slide output tray cover comprises a first side with a fluid inlet in communication one of the voids, and a second side configured to form a hydration chamber with a slide in said one of the voids to maintain hydration of the slide with fluid received from the fluid inlet for a designated time following treatment of the slide by the automated staining apparatus.

20 Claims, 8 Drawing Sheets

(51) Int. Cl.
    *G01N 1/31*        (2006.01)
    *G01N 35/04*     (2006.01)

(52) U.S. Cl.
    CPC . *B01L 2200/142* (2013.01); *B01L 2300/0822*
        (2013.01); *G01N 2035/00079* (2013.01); *G01N*
           *2035/00138* (2013.01); *G01N 2035/0498*
                       (2013.01)

(58) Field of Classification Search
    CPC ............ B01L 2300/0822; G01N 1/312; G01N
           35/00029; G01N 35/0099; G01N 35/04;
             G01N 2035/00079; G01N 2035/00138;
                            G01N 2035/0498
    See application file for complete search history.

(56)             References Cited

U.S. PATENT DOCUMENTS

| | | | | |
|---|---|---|---|---|
| 2006/0169719 | A1* | 8/2006 | Bui | G01N 1/312 |
| | | | | 222/325 |
| 2006/0171857 | A1* | 8/2006 | Stead | B01L 3/502715 |
| | | | | 422/400 |
| 2006/0178776 | A1 | 8/2006 | Feingold et al. | |
| 2013/0052331 | A1* | 2/2013 | Kram | G01N 1/2813 |
| | | | | 118/100 |
| 2013/0196339 | A1 | 8/2013 | Dowling et al. | |
| 2013/0201553 | A1* | 8/2013 | James | G02B 21/34 |
| | | | | 359/398 |
| 2014/0099631 | A1 | 4/2014 | Testa et al. | |
| 2014/0315256 | A1* | 10/2014 | Dockrill | B01L 3/5027 |
| | | | | 422/63 |
| 2015/0260621 | A1 | 9/2015 | Scott et al. | |
| 2015/0301033 | A1* | 10/2015 | Guo | G01N 33/54366 |
| | | | | 435/7.1 |

OTHER PUBLICATIONS

Office Action issued Jan. 31, 2024 in Chinese Application No. 201980063010.0.
Japanese Office Action issued Jul. 20, 2023 in Application No. 2021-516744.
Korean Examination Report for Korean Patent Application No. 10-2021-7009100, dated Oct. 25, 2024, 11 pages.
International Search Report of PCT/AU2019/051409 dated Feb. 7, 2020 [PCT/ISA/210].
Written Opinion of PCT/AU2019/051409 dated Feb. 7, 2020 [PCT/ISA/237].

\* cited by examiner

SLIDE OUTPUT MODULE

CROSS REFERENCE TO RELATED APPLICATIONS

This application is a National Stage of International Application No. PCT/AU2019/051409 filed on Dec. 19, 2019, claiming priority based on Australian Patent Application No. 2018904850 filed on Dec. 20, 2018.

TECHNICAL FIELD

The present invention relates to a slide output module for an automated staining apparatus for treating tissue samples disposed on slides. In particular, the present invention relates to forming a hydration chamber with a slide in a void of the slide output module to maintain hydration of the slide in the void with fluid for a designated period of time.

BACKGROUND OF INVENTION

Instrumentation for automated treatment of biological samples, such as anatomical pathology samples, is well known. Treatment may comprise staining procedures of the kinds that are typical in immunochemistry, in-situ hybridisation, special staining and cytology. Automation of some staining procedures has increased the speed with which pathology testing can be completed leading to earlier diagnosis and in some cases, intervention. Staining is typically performed on samples placed on microscopy slides to highlight certain histological features in a biological sample and incubation of the sample with small volumes of reagent is often performed. In many cases, automated staining of samples involves manipulation of robotic arms to deliver an aliquot of reagent to achieve staining.

In an example of an existing automated treatment apparatus in use, tissue samples are placed on slides and moved to slide treatment modules of the apparatus to be treated using reagents. The treatment of the samples here is performed automatically by one or more robots configured to dispense reagents to the samples on the slides in a predetermined sequence according to a staining protocol. Robots are also used to move slides automatically within the apparatus from an input module, where the slides are first loaded into the apparatus by an operator, to the slide treatment modules for treatment, and then to an output module. In the output module, the slides may sit for a length of time until before being removed by an operator. During this time, tissues samples on the slides may start to dehydrate and potentially be damaged.

Increased throughput of samples on slides through the automated staining apparatus is desirable but can also be problematic with a myriad of moving parts requiring calibration, maintenance and cleaning. In many cases, processed sample throughput is limited by batch processing regimes where sample processing times are limited by the slowest staining protocol (or treatment time) being administered in the batch in the slide treatment modules of the apparatus. Slides with treated tissue samples therein may therefore be located in the output module for varying lengths of time, with those left in the output module the longest either being subject to dehydration or operator intervention to prevent dehydration.

SUMMARY OF INVENTION

One aspect of the present invention provides a slide output module for an automated treatment apparatus for treating tissue samples disposed on slides, the slide output module comprising: a slide output tray assembly comprising a slide output tray adjacent to a slide output cover forming one or more voids between the slide output tray and the slide output tray cover for receiving slides therein, wherein the slide output tray cover comprises a first side with a fluid inlet in communication one of the voids, and a second side configured to form a hydration chamber with a slide in said one of the voids to maintain hydration of the slide with fluid received from the fluid inlet for a designated time following treatment of the slide by the automated staining apparatus.

Preferably, the slide output tray assembly comprises twenty four voids arranged in four rows of six columns. The voids enable slides to be located therein by, for example a robot of the automated treatment apparatus, after treating tissue samples on the slides in slide treatment modules of the apparatus, and for the slides to keep hydrated in the slide output module before being retrieved by an operator of the apparatus. In use of the apparatus, for instance, the slides may be located in the voids of the slide output module for up to twelve hours and the slides will stay hydrated in the slide output module even if the apparatus is bumped.

In an embodiment, the void is bound by a void ceiling in the second side of the slide output tray cover and the void ceiling comprises a surface configured to maintain hydration of the slide with the fluid received from the fluid inlet. Preferably, the fluid is DI water. Preferably, the fluid (e.g. DI water) comprises a surface tension (e.g. 72.2 dynes/cm) configured to maintain hydration of the slide with the fluid. That is, the fluid forms a meniscus bound by the void ceiling and the slide to assist in maintaining hydration of the slide with the fluid. The fluid is thus maintained over the tissue sample disposed on the slide.

The surface of the void ceiling may also comprise a finish to maintain hydration of the slide with the fluid received from the fluid inlet. For example, the finish is a flat finish, textured finish, ribbed finish, or a partially textured finish configured to enhance the maintenance of the hydration of the slide with the fluid. In addition, the surface may have material properties to enhance the maintenance of the hydration such as having a high surface energy. Further, the surface may be made from machined acrylic and is chemically resistant to DI Water, hot soapy water, detergent, alcohol and bleach. Further still, the void ceiling may have a uniform height (within a tolerance band) relative to the slide to maintain hydration of the slide with the fluid received from the fluid inlet.

In an embodiment, the void ceiling comprises two recesses extending longitudinally along the void ceiling in a direction relative to the slide, on either side of the fluid inlet, to maintain hydration of the slide with the fluid received from the fluid inlet. The recesses provide a perpendicular edge for the fluid between the slide and the void ceiling to facilitate a uniform meniscus forming at the edge of the slide to maintain hydration of the slide. Smooth or chamfered edges, on the other hand, would facilitate the meniscus creeping upward and away from the slide. In addition, the void ceiling may comprise rails extending longitudinally and projecting from the recesses, respectively.

In an embodiment, the void is bound by side walls of the slide output tray extending to the void ceiling. Further, the slide is located in the void on a base of the slide output tray between the side walls and with a gap between each side of the slide, wherein the gap between the side walls and the slide is also configured to maintain hydration of the slide with the fluid received from the fluid inlet. The gap allows for slide variation and fluid volume variation by providing a meniscus variation allowance at the edge of the slide. Further, the void ceiling comprises side wall recesses and the side walls extend into the side wall recesses of the void ceiling. For example, between 3.0 and 3.3 ml of fluid may be received from the fluid inlet to maintain hydration of the slide.

In an embodiment, the slide output tray comprises a fluid output in communication with one of the voids, and the slide output tray is provided at a designated angle longitudinally relative to the slide to enhance fluid propagation from the fluid inlet to the fluid outlet over the slide in the void. For example, the slide output tray is provided at a 1.5° angle longitudinally, and may be between 0.5° and 2.5°.

In an embodiment, the slide comprises a label at one end and the slide is located in the void such that the fluid propagation from the fluid inlet to the fluid outlet is away from the label. Further, the slide output tray comprises slide retaining lip at one end and the fluid output is at an opposed end to the slide retaining lip. Thus, for example, if the apparatus is accidentally bumped, the slide is not ejected from the void.

In an embodiment, the slide output tray comprises datum references to enhance positional accuracy of a robot of the automated treatment apparatus locating the slides in the voids. Also, the slide output tray cover comprises a scalloped slide input adjacent the fluid inlet that is configured to minimise said tissue samples on the slides scraping on the slide output tray cover when the slide is located in the void by, the robot, or is removed from the void by the robot.

In an embodiment, the slide output tray is pivotally connected to the slide output cover. Thus, the slide output tray and the inside of the slide output cover can readily be accessed to be cleaned.

In an embodiment, the slide output tray assembly is moveable between a closed position of the slide output module in which the slides in the voids are accessible by the automated staining apparatus and an open position of the slide output module in which the slides in the voids are accessible by an operator of the automated staining apparatus. Further, the slide output tray assembly is pivoted between the closed position and the open position. For example, the slide output module has a door and the slide output tray assembly is mounted to the door such that the operator can open the door when in the closed position which pivots the slide output tray assembly to the open position.

In an embodiment, the slide output module further comprises a static hydration waste bucket in communication with the voids of the slide output tray assembly, and the fluid received from the fluid inlet in the voids is propagated to the static hydration waste bucket when the slide output tray assembly is in the closed position. As mentioned, in one embodiment, the slide output tray comprises a fluid output in communication with one of the voids, and the slide output tray is provided at a designated angle to effect the propagation of fluid. The fluid then propagates and drains from the fluid output to the static hydration waste bucket when the slide output tray assembly is in the closed position.

The slide output module further comprises a dynamic hydration waste bucket in communication with the voids of the slide output tray assembly, and the fluid received from the fluid inlet in the voids is propagated to the dynamic hydration waste bucket when the slide output tray assembly is pivoted from the closed position to the open position. The fluid in the dynamic hydration bucket is then propagated to the static hydration waste bucket when the slide output tray assembly is pivoted from the open position to the closed position.

Another aspect of the present invention provides a method of hydrating tissue samples disposed on slides, the method comprising the steps of: the automated treatment apparatus locating a slide in a void in a slide output module of the automated treatment apparatus following treatment by the automated treatment apparatus, wherein the void is formed in a slide output tray assembly of the slide output module comprising a slide output tray adjacent to a slide output cover; the automated treatment apparatus inputting fluid to the slide in the void via a fluid inlet in a first side of the slide output tray cover, wherein the fluid inlet is in communication with the void; and the void forming a hydration chamber with the slide in the void and a second side of the slide output tray cover to maintain hydration of the slide with the fluid for a designated time.

DETAILED DESCRIPTION

Figure 1:
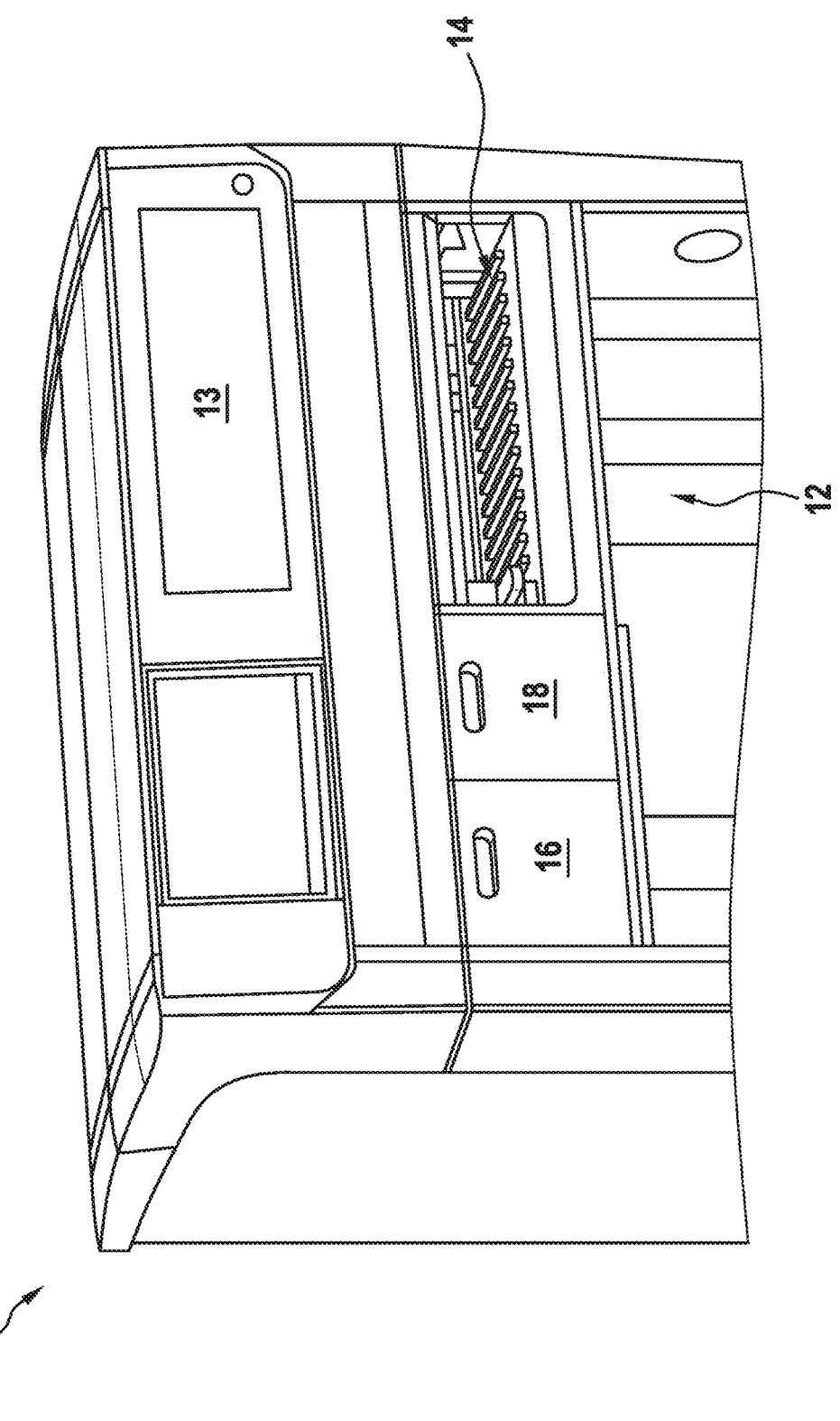
FIG. 1 is a perspective view of an automated slide treatment apparatus according to an embodiment of the present invention.

An automated tissue sample treatment apparatus 10 for treating one or more tissue samples disposed on slides according to an embodiment of the present invention is shown in FIG. 1. In the embodiment, the apparatus 10 comprises a controller (not shown) that is configured to operate the apparatus 10 to automatically treat tissue samples on the slides. However, it will be appreciated by a person skilled in the art that in other embodiments the controller can be implemented remotely from the apparatus 10.

The apparatus 10 comprises a plurality of slide treatment modules (not shown) located under a housing 13 that are arranged to receive the slides for treatment. The apparatus 10 further comprises at least one bulk fluid robot (BFR), also located under the housing 13, configured by the controller to dispense a plurality of reagents stored in reagent containers 12 to the slides received in the slide treatment modules 12 via an output nozzle disposed on the BFRs to treat tissue samples on the slides. In the embodiment, the BFRs are configured by the controller to dispense reagents (e.g. bulk fluid reagents) to the slides, such as oxalic acid, sulphuric acid, potassium permanganate, alcohol, dewaxing agent, haematoxylin, peroxide, citric acid, EDTA, DI water, and Bond™ wash, to treat the tissue samples disposed thereon.

The apparatus 10 also comprises at least one pumping means (not shown) for pumping the reagents to the output nozzle of the BFRs from the reagent containers 12. The BFRs are configured by the controller to dispense these reagents in a predetermined sequence for the sides in the slide treatment modules to treat the one or more tissue samples disposed on each of the slides independently. In order for the reagents to be dispensed, the apparatus 10 comprises a plurality of reagent lines (not shown) associated with each of the reagents which extend from each of the reagent containers 12 via the respective pumping means to the BFRs.

Additionally, the apparatus 10 comprises a fluid transfer probe (FTP) robot, located under the housing 13, configured by the controller to dispense a plurality of high value reagents stored in high value reagent containers 14 to the slides in the slide treatment modules via an FTP nozzle disposed on the FTP robot to the tissue samples. Thus, in use, the BFRs and the FTP robot are configured by the controller to dispense bulk fluid reagents and high value reagents in a predetermined sequence to treat the tissue samples on the slides and, in one example, stain the tissue samples according to a predetermined staining protocol for in-situ hybridization (ISH) and immunohistochemical (IHC) applications. Thus, in this way, the BFRs and the FTP robot are configured by the controller to dispense reagents for each of the slide treatment modules to treat (e.g. stain) tissue samples disposed on each of the slides in the slide treatment modules independently.

In an embodiment, the FTP robot is also configured by the controller to move the slides in the apparatus 10 between the various modules of the apparatus 10 for treating the tissue samples on each of the slides independently. The FTP robot may comprise a gripper, such as a suction means, to grip a slide and move the slide from an input module 16, where an operator of the apparatus 10 introduces slides with tissue samples thereon to the apparatus 10 for treatment, to a slide treatment module so that the tissue samples on the slide can be treated or stained. To do so, the FTP robot is configured by the controller to move in the x, y, z and 8 (theta) axes. Also, the BFRs are configured by the controller to move in the x, y and z axes so that they do not interfere with the movement of the slides by the FTP robot. Following treatment, the FTP robot moves the slide S to an output module 18 to await removal of the slide S from the apparatus 10. Whilst awaiting removal, the output module 18 is configured to maintain hydration of the slide for a designated time such as four to twelve hours.

The primary function of the slide input module 16 is to house slides that require staining and the primary function of the slide output module 18 is to house slides that have finished being stained. These modules 16 18 are accessed by both the operator of the apparatus 18 (when opened) and a robot, such as the FTP robot, (when closed), and are independent in a way that if the robot is accessing the output module 18, an operator can still open the input module 16.

Figure 2:
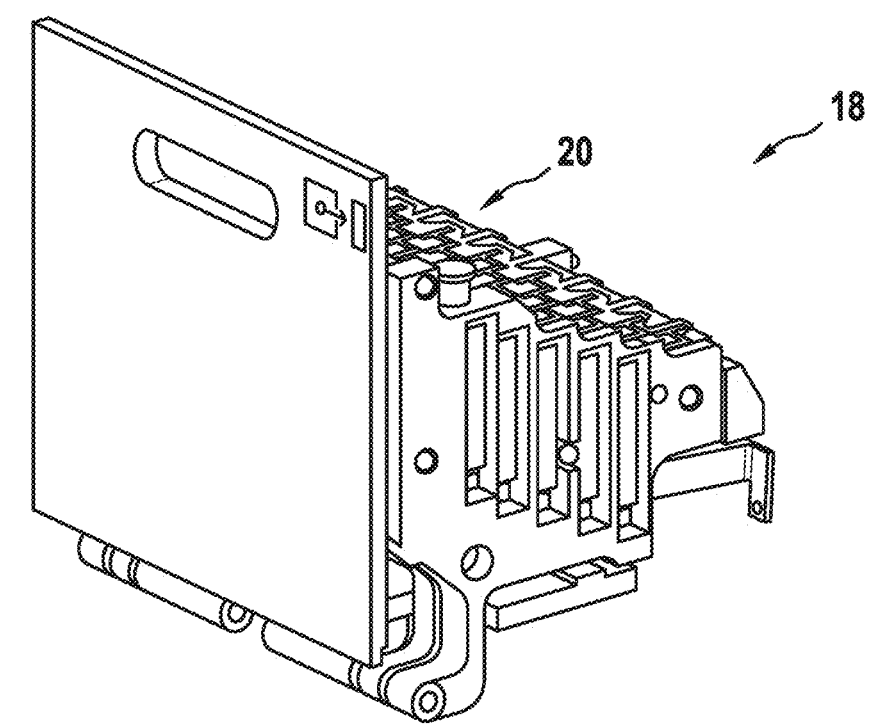
FIG. 2 is a perspective view of a slide output module in the closed position according to an embodiment of the present invention.
Figure 3:
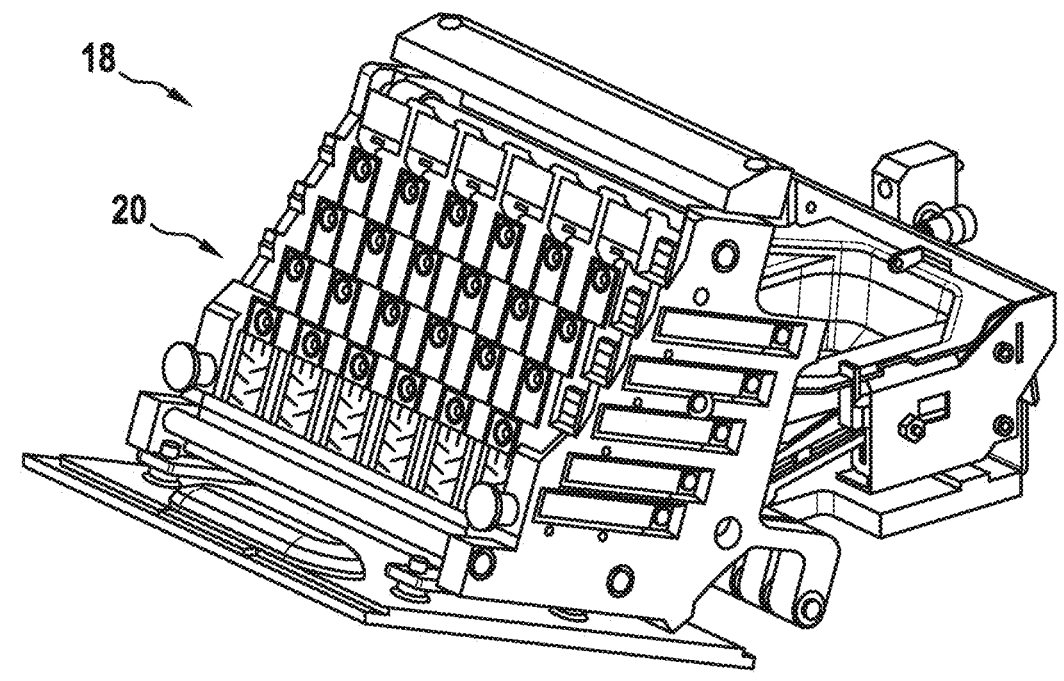
FIG. 3 is a perspective view of the slide output module of FIG. 2 in the open position.
Figure 4:
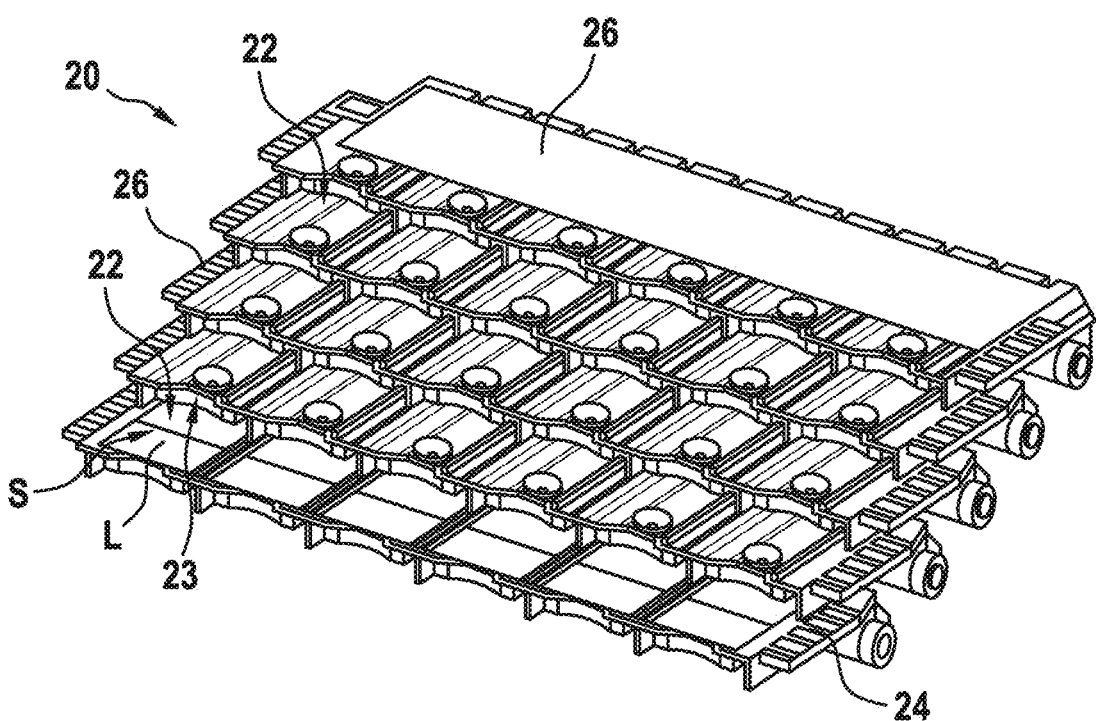
FIG. 4 is a perspective view of a slide output tray assembly according to an embodiment of the present invention.

FIG. 2 and FIG. 3 show the output module 18 of the automated treatment apparatus 10 in more detail. FIG. 2 shows the output module 18 in the closed position and FIG. 3 shows the output module 18 pivoted to the open position. The output module 18 comprises a slide output tray assembly 20 comprising twenty four slide positions 22, each having a void 23, which is shown more clearly in FIG. 5, fora slide S to be located therein. The input module 16 also comprises a similar configured slide input tray assembly comprising twenty four similar configured slide positions. To achieve the twenty four slide positions, slide output trays 24, shown more clearly in FIG. 4, are part of the slide tray assembly 20 which stacks the slide output trays 24 on top of each other and staggers them like a stair case. The staggered arrangement is to enable Barcode reading and robot access for handling of the slides.

The input module 16 and output module 18 are not identical due to the special features required for slide hydration which occurs in the output module 18 only. Hydration in the output module 18 ensures that the slide is readily available to the operator, following staining of the tissue samples on the slide, when they require it and it is not dried out. If output hydration was not implemented, hydration would have to occur in another module of the apparatus 10, such as the slide staining modules. In this case, for instance, the operator would be required to request individual slides from the slide staining modules which would take the robot say 15 seconds to retrieve from a slide staining module. If 24 slides were requested, it would take around 6 minutes.

That is, the staggered design of the slide tray assembly 20 allows the most amounts of slides in a small foot print while still being able to identify, handle and hydrate slides. The slide tray assemblies 20 will attempt to datum the slides as much as practical in the input module 16 to assist robotic alignment of the slides in the slide staining modules and in the output module 18 to ease the insertion in the output tray window. The slide output tray assembly 20 will have more X and Y clearance for the robot to insert a slide. If, for example, a slide moves out of position during the slide staining module lid opening operation then slide insertion may be compromised.

More specifically, in the embodiment shown in FIG. 4, the slide output tray assembly 20 comprises four slide output trays 24 and four slide output tray covers 26, and each of the slide output trays 24 and the slide output tray covers 26 has four slide positions 22. That is, the slide output trays 24 are adjacent the slide output covers 26 so as to form twenty four slide positions 22. Each of these slide positions 22 forms voids 23, between the slide output trays 24 and the slide output tray covers 26, for receiving slides S therein. FIG. 4 shows one row of six slide positions 22 having slides S received in the voids 23, respectively. Also, each of the slide output trays 24 are pivotally connected to respective slide output covers 26 so that the voids 23 can be accessed and cleaned.

Figure 5:
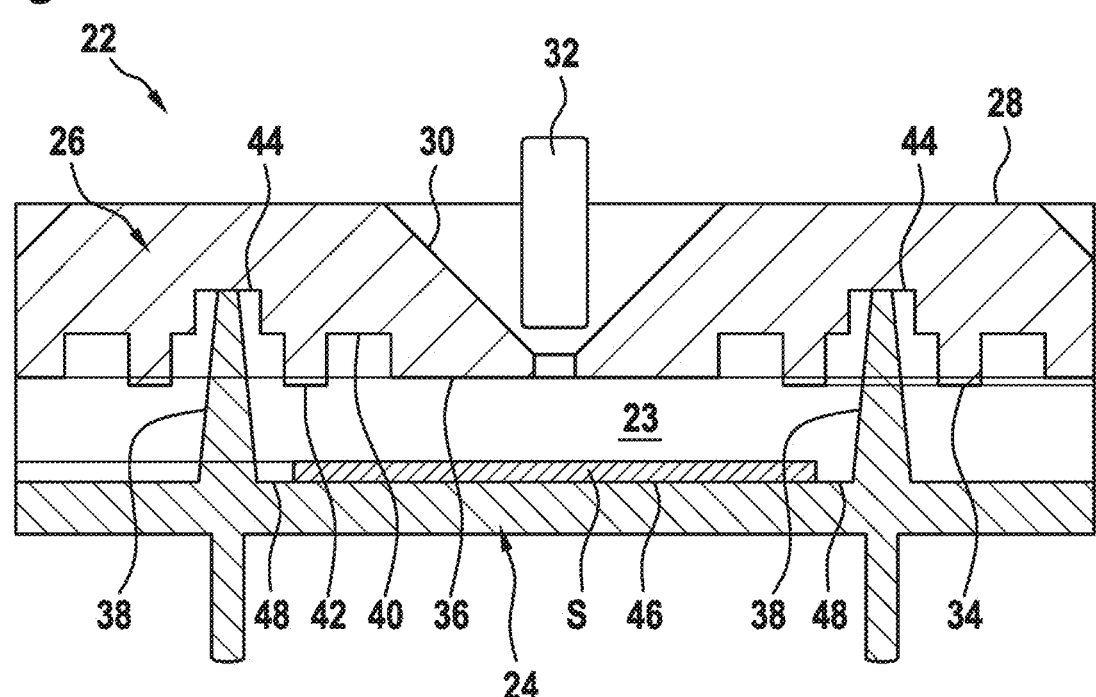
FIG. 5 is a section view of a void formed between a slide output tray and a slide output tray cover according to an embodiment of the present invention.

One of the slide positions 22 is shown in more detail in FIG. 5. In this section view of part of the slide output tray assembly 20, it can be seen that the slide output tray cover 26 comprises a first side 28 with a fluid inlet 30 in communication one of the voids 23. The fluid inlet 30 is funnel shaped to facilitate fluid from a dispense probe 32 to be communicated to the void 23 (i.e. there are no sharp edges for the fluid). As mentioned, the fluid is generally DI water to maintain hydration of the slide. Further, in use, the dispense probe 32 is configured to dispense fluid whilst not touching the funnel shaped fluid inlet 30.

The slide output tray cover 26 also has a second side 34 configured to form a hydration chamber with a slide S in the void 23 to maintain hydration of the slide S with the fluid received from the fluid inlet 30 for a designated time (e.g. 12 hours) following treatment of the slide by the automated staining apparatus 10 (e.g. staining).

The void 23 is bound by a void ceiling 36 in the second side 34 of the slide output tray cover 26, the slide S, and by side walls 38 of the slide output tray 24 extending to the void ceiling 36. As mentioned, the void ceiling 36 comprises a surface that is configured to maintain hydration of the slide S with the fluid received from the fluid inlet 30. In the embodiment, the surface of the void ceiling 36 has a high surface energy material property to enhance the maintenance of the hydration and has a uniform height of around 3 mm relative to the slide S. In addition, the surface of the void ceiling 36 may comprise a finish, such as a textured finish, to maintain hydration of the slide with the fluid received from the fluid inlet 30. Preferably, the fluid (e.g. DI water) comprises a surface tension (e.g. 72.2 dynes/cm) configured to maintain hydration of the slide with the fluid. That is, the fluid forms a meniscus bound by the void ceiling 36 and the slide S to assist in maintaining hydration of the slide S with the fluid. The fluid is thus maintained over the tissue sample disposed on the slide S.

The void ceiling 36 further comprises two recesses 40 extending longitudinally along the void ceiling 36 in a direction relative to the slide S, on either side of the fluid inlet 30, to maintain hydration of the slide with the fluid received from the fluid inlet. Further, the void ceiling 36 comprises rails 42 extending longitudinally and projecting from the recesses 42, respectively. The void ceiling 36 further comprises side wall recesses 44 and the side walls extend into the side wall recesses 44 of the void ceiling 36. The slide S is located in the void 23 on a base 46 of the slide output tray 24 between the side walls 38 and with a gap 48 between each side of the slide S. The base 46 may have rails protruding slightly from the base 46 to reduce the contact area between the under face of the slide S and the base 46 so as to avoid instances of the Slide S sticking to the base 46 or debris sticking to the base 46 which may skew the Slide S relative to the base.

Figures 6, 7:
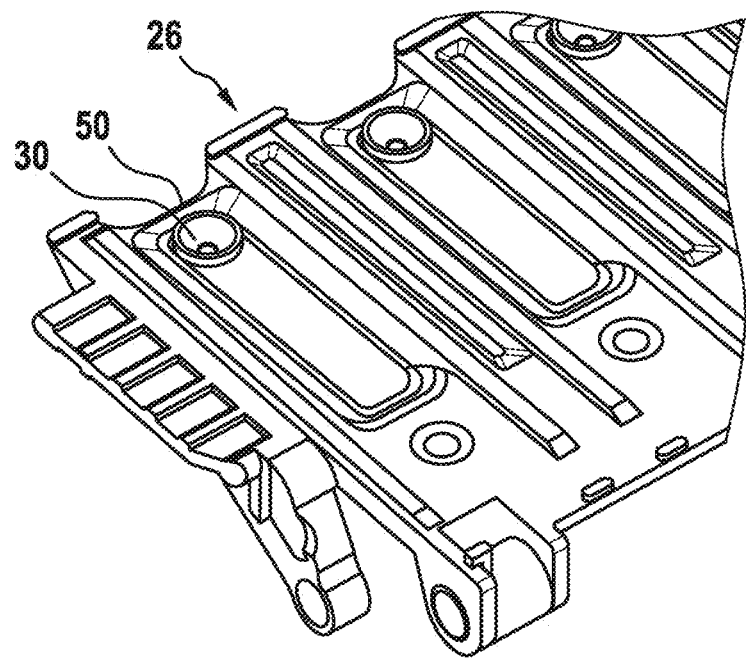
FIG. 6 is a perspective view of part of a slide output tray cover according to an embodiment of the present invention.
FIG. 7 is a perspective view of part of a slide output tray according to an embodiment of the present invention.
Figure 8:
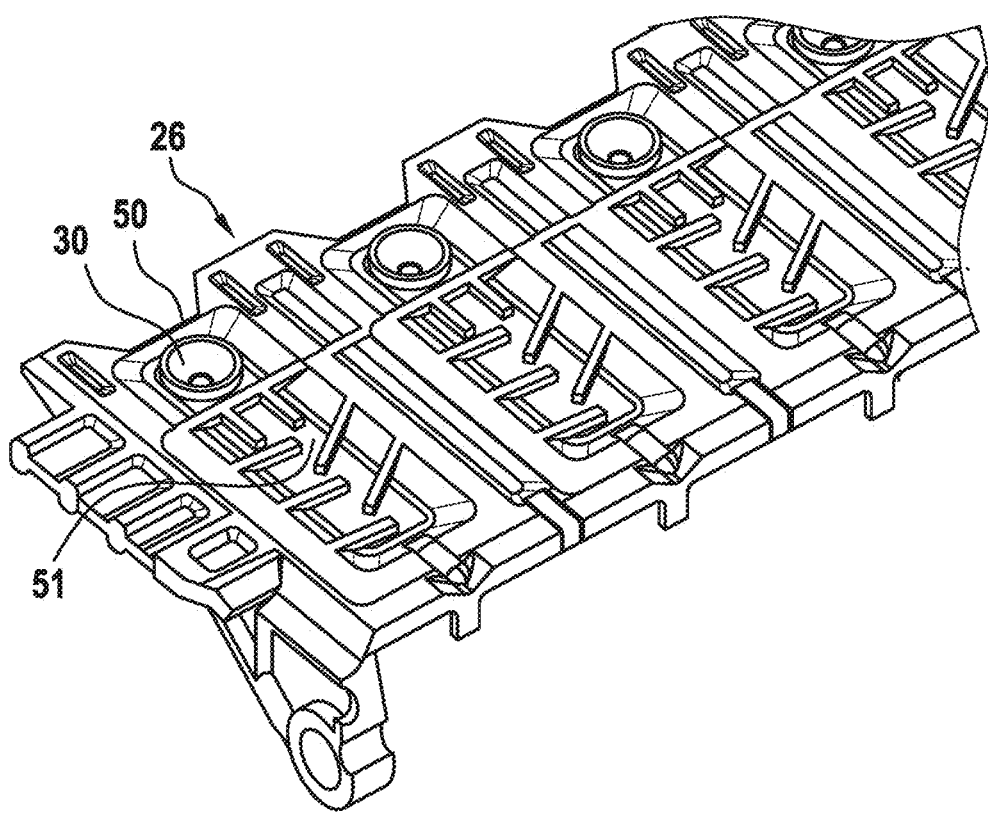
FIG. 8 is a perspective view of part of the slide output tray cover of FIG. 6.
Figure 9:
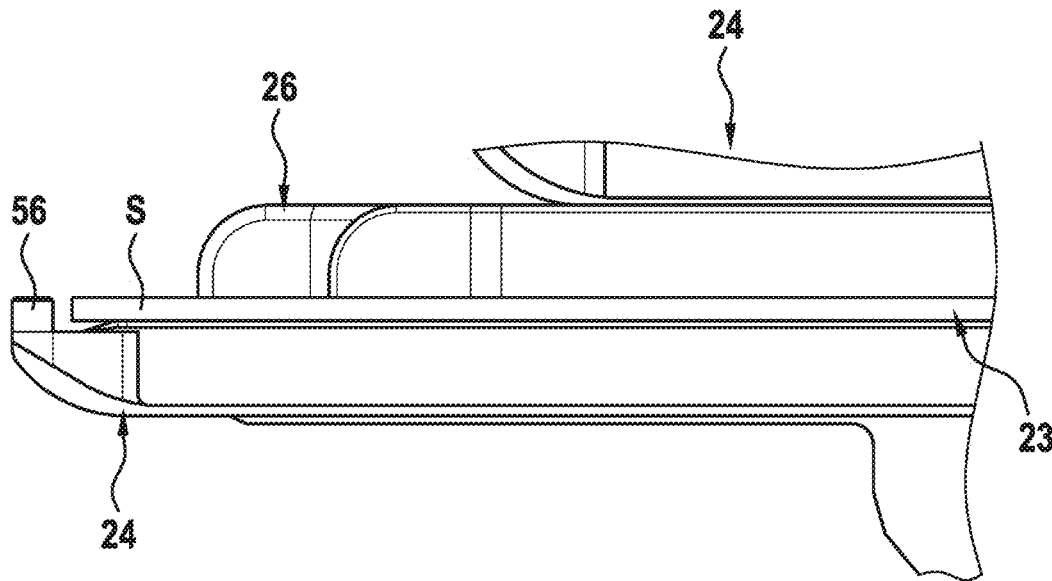
FIG. 9 is a side view of part of a slide output tray assembly according to an embodiment of the present invention.

The slide output tray cover 26 is shown in more detail in FIGS. 6 and 8, and the slide output tray 24 is shown in more detail in FIG. 7. Slide S is shown as being located in void 23 formed between the slide output tray cover 26 and the slide output tray 24 in FIG. 9. The slide output tray cover 26 comprises a scalloped slide input 50 adjacent the fluid inlet 30 that is configured to minimise tissue samples on the slides S scraping on the slide output tray cover 26 when the slide S is located in the void 23 by a robot of the apparatus 10. The slide output tray cover 26 is also configured to drain away excess fluid from the fluid inlet 30. FIG. 8 shows the underside of the slide output tray cover 26 having ribs 51 configured to drain the fluid from the fluid inlet 30 over the designated time.

To further assist in locating the slides in the voids, the slide output tray 24 has slide datum references 54 to enhance the positional accuracy of the robot of the apparatus 10 locating slides in the voids 23 shown in FIG. 7. FIG. 7 also shows the slide output tray 24 comprising a fluid output 52, in communication with the void 23. The slide output tray 24 is also provided at a designated angle longitudinally relative to the slide in the apparatus 10 to enhance fluid propagation from the fluid inlet 30 to the fluid outlet 52 over the slide S in the void.

Referring back to FIG. 4, the slides comprise a label L at one end of the slide S and the slides S are located in the voids 23 such that fluid propagates from the fluid 30 inlet to the fluid outlet 52 in a direction away from the label L because of the angle of the slide output tray 24. The slide output tray 24 further comprises a slide retaining lip 56 at one end and the fluid output 52 is at an opposed end to the slide retaining lip 56. The slide retaining lip 56 prevents the slide S from being inadvertently bumped out of the void 23, which may adversely affect the hydration of the slide S, and in some cases into another area of the apparatus 10.

Figure 10:
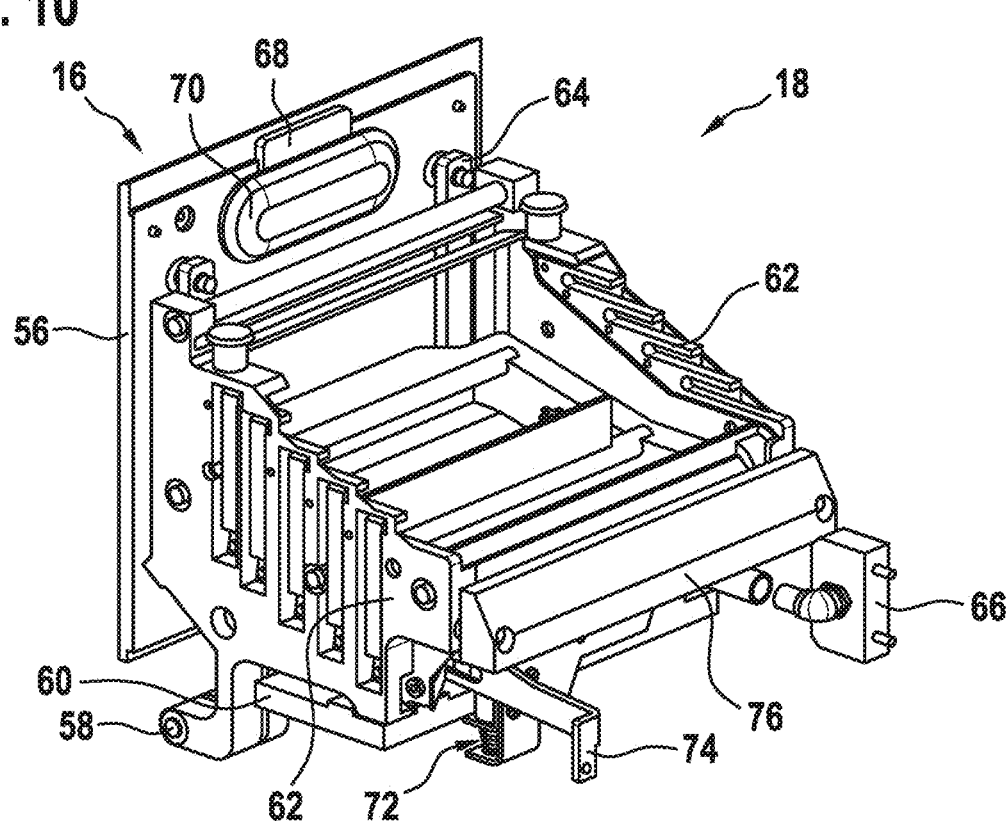
FIG. 10 is a perspective view of a slide output module according to an embodiment of the present invention.

FIGS. 10 to 13 show features of the slide output module 18 in further detail. FIG. 10 shows a slide output module 18 or a slide input module 16, without the tray assembly 20, in the form of a rotary drawer which pivots from the closed position to the open position around an axle 58. The drawers are manually operated using a front door 56. As mentioned, the input 16 and output 18 modules have a capacity of 24 slides in 4 rows of 6 columns. The modules 16 18 are built on a chassis plate 60, which includes a rod holder housing and a fixed rod. The side plates 62 rotate on the rod. A slide tray assembly, such as output slide tray assembly 20, is datumed and locked inside the side plates 62. Door arms 64 are also mounted on the same axle 58 while remaining independent of the side plates 62. Two custom springs installed on each door arm create the lost motion function between the side plates 62 and the door arms 64. It ensures the door 56 and the slide tray assembly 20 are decoupled to avoid instances of hydration failure and to minimise transmission of vibration from door 56 to slide tray assembly 20. In addition, two shoulder bolts screwed on each door arm 64 are picking up the side plates 62 while opening or closing the drawer.

The drawer mechanism uses a hydraulic non-pressurized damper 66 in compression during closing. The damper 66 prevents the user from increasing the drawer's speed while closing it. It reduces the risk of slides falling and DI water spilling while closing the drawer. It does not stop the user from abuse but educates them to not slam the door 56 shut.

The damper 66 retaining force while opening the drawer is minimal. Consequently a soft close damper is used to damp the motion on the open position. Once the door 56 is in the closed position, tension springs will pull the door in against the fascia of the apparatus 10. The tension springs ensure a suitable pulling force for the user while opening. Counterweight 76 also ensures a suitable pulling and closing force for the user.

The drawer locking and presence detection mechanism 72 comprises of an opto-sensor 68, a solenoid, and a check strap 74. The mechanism also includes two shoulder bolts. The solenoid pin is used to push the check strap 74 up. If the operator attempts to open the drawer, the check strap 74 will lock on the shoulder bolt. The lost motion allows the door 56 to slightly open and will not affect slides (or hydration). In case of a power off or deactivation of the solenoid, the check strap 74 goes down on its own weight and unlocks the drawer.

Figure 11:
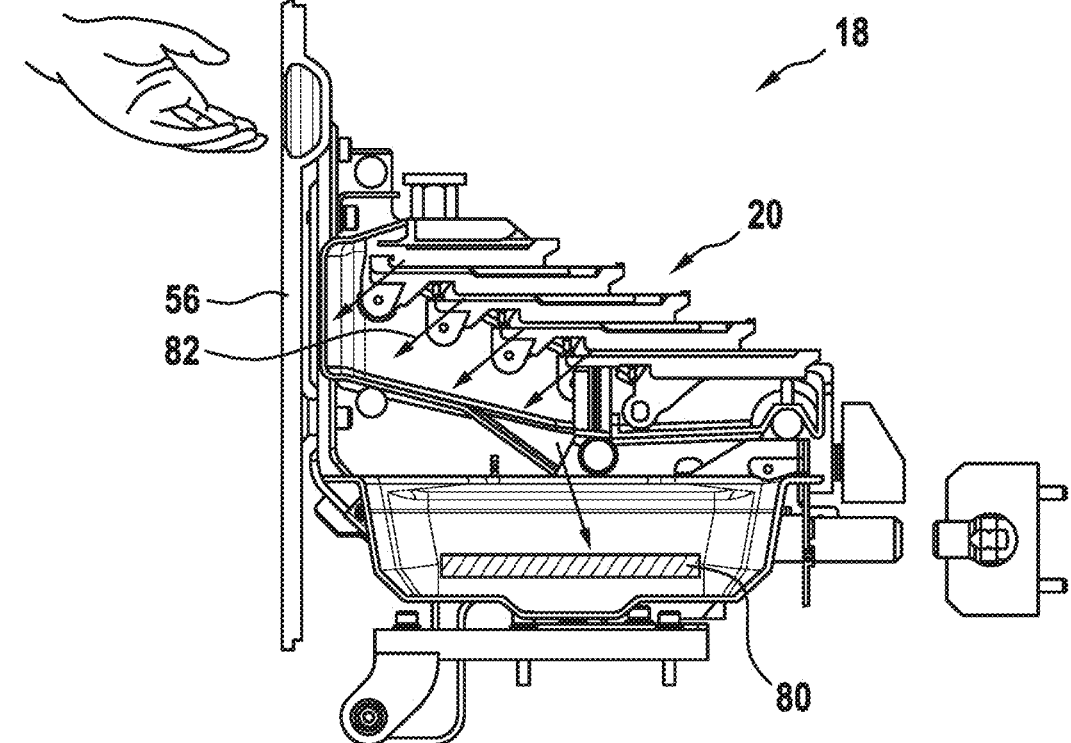
FIG. 11 is a side view of a slide output module in the closed position according to an embodiment of the present invention.

As mentioned, the slide output tray assembly 20 is pivoted between a closed position of the slide output module in which the slides in the voids are accessible by a robot of the automated staining apparatus 10 and an open position of the slide output module 18 in which the slides in the voids are accessible by an operator of the automated staining apparatus 10. The slide output module 18 further comprises a static hydration waste bucket 80 in communication with the voids of the slide output tray assembly 20 via a fluid path 82 so that fluid received from the fluid inlet 30 in the voids is propagated to the static hydration waste bucket 80 when the slide output tray assembly is in the closed position, as shown in FIG. 11. That is, to minimise the amount of fluid left when in the open position, some of the fluid is already transferred to the static hydration waste bucket 80 before the door 56 is opened. The static hydration waste bucket 80 is a cavity with a capacity of around 430 mL. Further, the static hydration waste bucket 80 has a liquid level sensor configured to sense a designated volume of fluid in the static hydration waste bucket 80 to alert the operator or the apparatus 10 to remove the fluid in the static hydration waste bucket 80.

Figure 12:
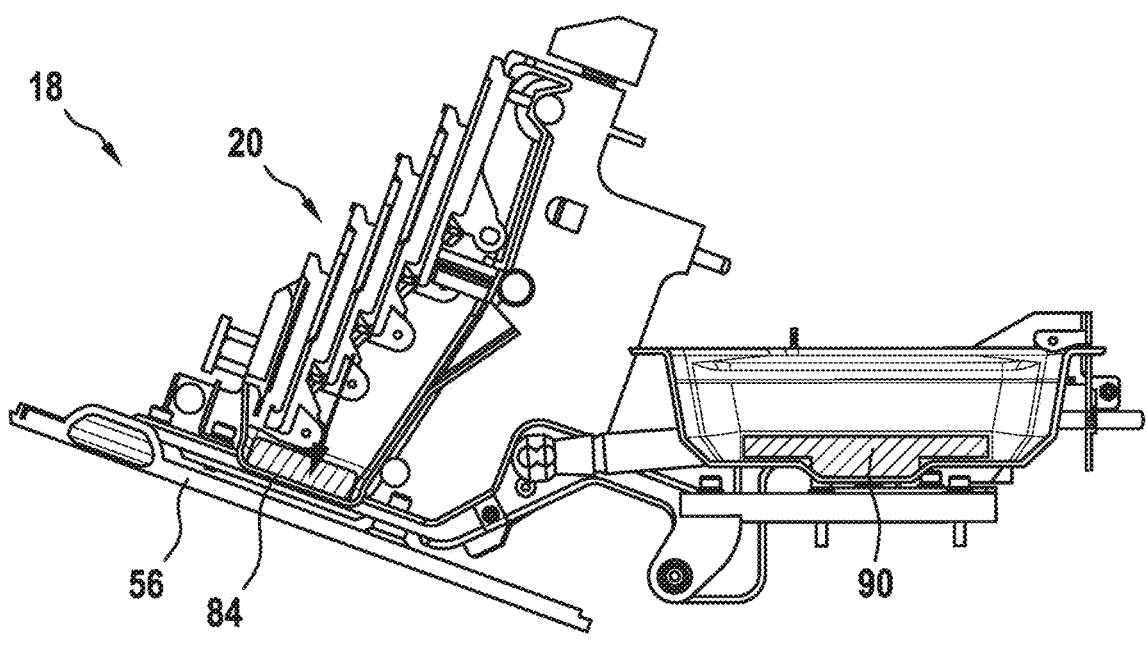
FIG. 12 is a further side view of the slide output module of FIG. 11 in the open position.

The slide output module 18 further comprises a dynamic hydration waste bucket 84 in communication with the voids of the slide output tray assembly 20 so that fluid received from the fluid inlet 30 in the voids is propagated to the dynamic hydration waste bucket 84 when the slide output tray assembly 20 is pivoted from the closed position to the open position, as shown in FIG. 12. The dynamic hydration waste bucket 84 is a cavity with a capacity of around 215 mL, and is configured to stop fluid from splashing out of the bucket 84 while the door 56 is being closed or opened. To do so, the dynamic hydration waste bucket 84 is shaped like a cavity in the door 56 with a wall to prevent the fluid from splashing out of the bucket 84 whilst the door 56 is being opened and closed.

Figure 13:
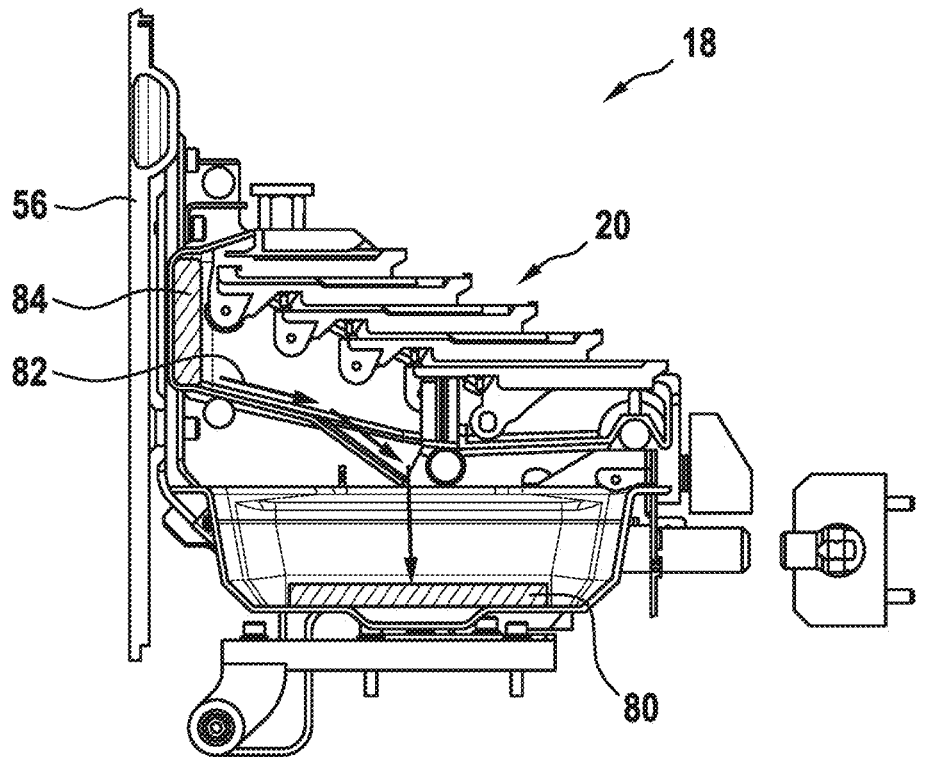
FIG. 13 is a further side view of the slide output module of FIG. 11 in the closed position.

Further, the fluid in the dynamic hydration bucket 84 is propagated to the static hydration waste bucket 80 via the fluid path 82 when the slide output tray assembly 20 is pivoted back to the closed position, as shown in FIG. 13. While the drawer is being closed, the remaining of the fluid is transferred inside the static drain bucket 84.

Figure 14:
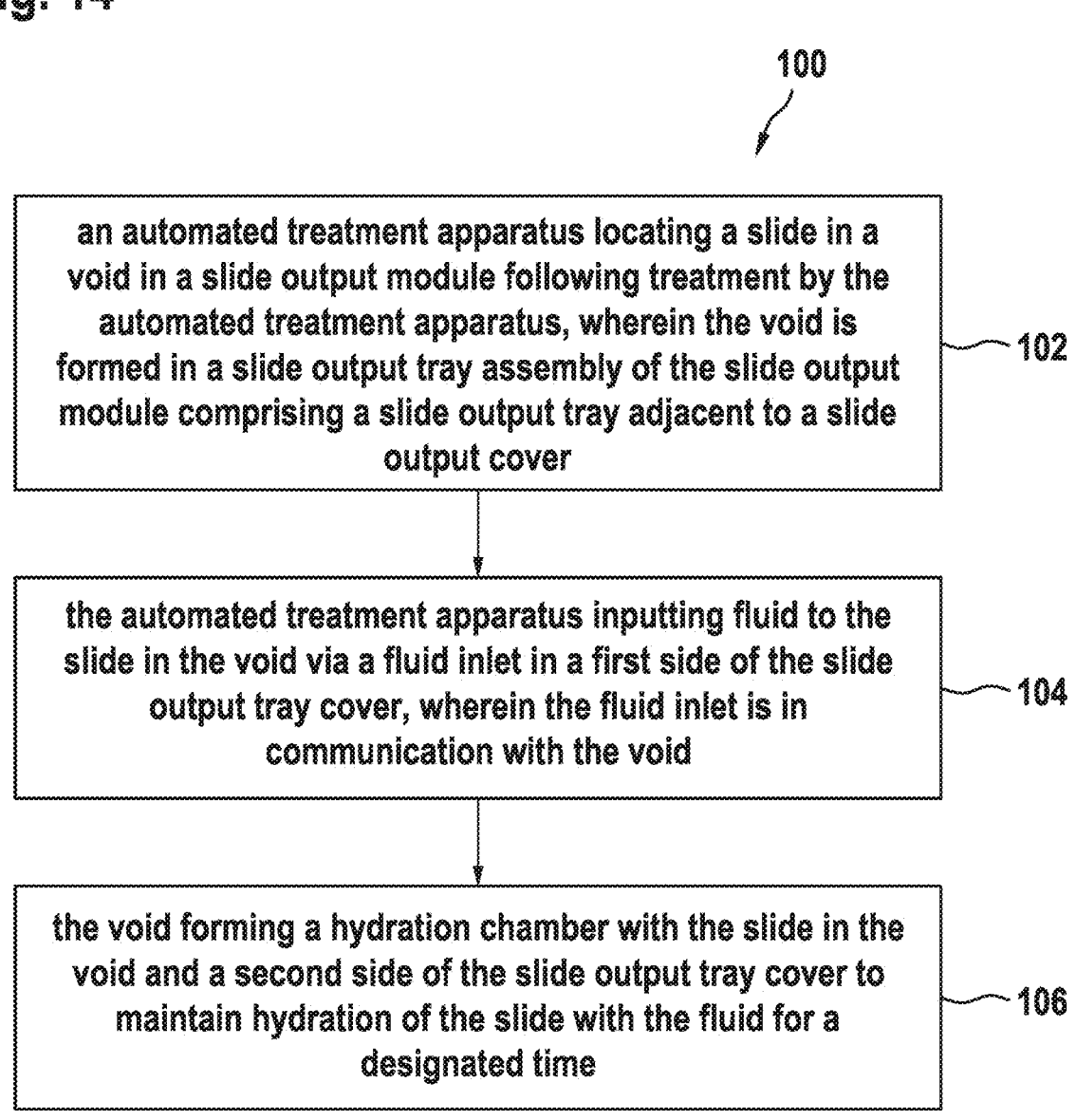
FIG. 14 is a flow chart of a method of hydrating tissue samples according to an embodiment of the present invention.

Referring now to FIG. 14, there is shown a flow chart summarising a method 100 of hydrating tissue samples disposed on slides, the method comprising the steps of: an automated treatment apparatus locating 102 a slide in a void in a slide output module of the automated treatment apparatus following treatment by the automated treatment apparatus, wherein the void is formed in a slide output tray assembly of the slide output module comprising a slide output tray adjacent to a slide output cover; the automated treatment apparatus inputting 104 fluid to the slide in the void via a fluid inlet in a first side of the slide output tray cover, wherein the fluid inlet is in communication with the void; and the void forming 106 a forming a hydration chamber with the slide in the void and a second side of the slide output tray cover to maintain hydration of the slide with the fluid for a designated time.

Further aspects of the method will be apparent from the above description of the apparatus 10. Persons skilled in the art will also appreciate that the method could be embodied in program code. The program code could be supplied in a number of ways, for example on a tangible computer readable medium, such as a disc or on a memory or as a data file (for example, by transmitting it from a server).

In an embodiment, the controller of the apparatus 10 implements modules on a processor in connection with instructions stored in a memory to control movement and reagent dispensing for each BFR and FTP robot, and fluid dispensing for hydrating tissue samples on the slides via the dispense probe 32. It will be appreciated by those persons skilled in the art that the memory may reside in the computer housed in the apparatus 10 or may be hosted remote from the computer in data communication with the controller.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The discussion of documents, acts, materials, devices, articles and the like is comprised in this specification solely for the purpose of providing a context for the present invention. It is not suggested or represented that any or all of these matters formed part of the prior art base or were common general knowledge in the field relevant to the present invention as it existed before the priority date of each claim of this application.

Throughout the description and claims of this specification, the word "comprise" and variations of the word, such as "comprising" and "comprises", is not intended to exclude other additives, components, integers or steps.

The invention claimed is:

1. A slide output module for an automated treatment apparatus for treating tissue samples disposed on slides, the slide output module comprising:
   a slide output tray assembly comprising a plurality of slide output trays and a plurality of slide output tray covers, each of the slide output trays adjacent to a respective one of the slide output tray covers forming a plurality of voids between the slide output tray and the slide output tray cover for receiving slides therein,
   wherein each of the plurality of slide output tray covers comprises a first side with a fluid inlet in communication with one of the plurality of voids, and a second side configured to form a hydration chamber with a slide in one of the plurality of voids to maintain hydration of the slide with fluid received from the fluid inlet for a designated time following treatment of the slide by the automated treatment apparatus,
   wherein the plurality of slide output trays and slide output tray covers are provided in a stacked arrangement forming a plurality of steps.

2. The slide output module of claim 1, wherein each of the plurality of voids is at least partially bound by side walls of the slide output tray extending to the void ceiling.

3. The slide output module of claim 2, wherein each slide is located in a respective void of the plurality of voids on a base of the slide output tray between the side walls and with a gap between each side of the slide, wherein the gap between the side walls and the slide is configured to maintain hydration of the slide with the fluid received from the fluid inlet and/or the void ceiling comprises side wall recesses and the side walls extend into the side wall recesses of the void ceiling.

4. The slide output module of claim 1, wherein each of the plurality of slide output trays comprises a fluid outlet in communication with one of the plurality of voids, and each of the plurality of slide output trays is provided at a designated angle longitudinally relative to slides to enhance fluid propagation from the fluid inlet to the fluid outlet over the slides in the plurality of voids.

5. The slide output module of claim 4, wherein each of the slides comprises a label at one end and each of the slides is located in a respective void of the plurality of voids such that the fluid propagation from the fluid inlet to the fluid outlet is away from the label and/or each of the plurality of slide output trays comprises a slide retaining lip at one end and the fluid output is at an opposed end to the slide retaining lip.

6. The slide output module of claim 1, wherein the slide output tray cover comprises a scalloped slide input adjacent the fluid inlet that is configured to minimize said tissue samples on the slides scraping on the slide output tray cover when the slide is located in the void.

7. The slide output module of claim 1, wherein the slide output tray assembly is moveable between a closed position of the slide output module in which the slides in the voids are accessible by an automated staining apparatus and an open position of the slide output module in which the slides in the voids are accessible by an operator of the automated staining apparatus.

8. The slide output module of claim 7, wherein the slide output tray assembly, including the slide output tray and the slide output tray cover, is pivoted between the closed position and the open position.

9. The slide output module of claim 8, wherein the slide output module further comprises a static hydration waste bucket in communication with the plurality of voids of the slide output tray assembly, and the fluid received from the fluid inlet in the one of the plurality of voids is propagated to the static hydration waste bucket when the slide output tray assembly is in the closed position.

10. The slide output module of claim 9, wherein the slide output module further comprises a dynamic hydration waste bucket in communication with the plurality of voids of the slide output tray assembly, and the fluid received from the fluid inlet in the one of the plurality of voids is propagated to the dynamic hydration waste bucket when the slide output tray assembly is pivoted from the closed position to the open position.

11. The slide output module of claim 10, wherein the fluid in the dynamic hydration bucket is propagated to the static hydration waste bucket when the slide output tray assembly is pivoted from the open position to the closed position.

12. The slide output module of claim 1, wherein the fluid comprises a surface tension configured to maintain hydration of the slide with the fluid.

13. The slide output module of claim 1, wherein the slide output tray comprises a base and a plurality of side walls extending from the base and wherein the second side of the slide output tray cover, the base, and the plurality of side walls together form the plurality of voids for receiving the slides therein.

14. The slide output module of claim 1, wherein the first side of at least one of the plurality of slide output tray covers forms one of the plurality of slide output trays.

15. The slide output module of claim 1, wherein each of the plurality of voids is bound by a void ceiling in the second side of the slide output tray cover, the void ceiling comprising a surface to maintain hydration of the slide with the fluid received from the fluid inlet, and wherein the void ceiling has a uniform height relative to the slide to maintain hydration of the slide with the fluid received from the fluid inlet, and wherein the surface of the void ceiling comprises a finish to maintain hydration of the slide with the fluid received from the fluid inlet and the finish is configured such that a meniscus can be formed by the fluid when it is received.

16. The slide output module of claim 15, wherein the finish is a flat finish, textured finish, ribbed finish, or a partially textured finish.

17. The slide output module of claim 15, wherein the void ceiling comprises two recesses extending longitudinally along the void ceiling in a direction relative to the slide, on either side of the fluid inlet, to maintain hydration of the slide with the fluid received from the fluid inlet.

18. The slide output module of claim 17, wherein the void ceiling comprises rails extending longitudinally and projecting from the recesses, respectively.

19. The slide output module of claim 15, wherein the void ceiling of each of the plurality of voids comprises side wall recesses extending longitudinally along the void ceiling in a direction relative to the slide, on either side of the fluid inlet, each recess defining a perpendicular edge.

20. A method of hydrating tissue samples disposed on slides, the method comprising the steps of:

an automated treatment apparatus locating a slide in one of a plurality of voids in a slide output module of the automated treatment apparatus following treatment by the automated treatment apparatus, wherein the slide output module comprises:

a slide output tray assembly comprising a plurality of slide output trays and a plurality of slide output tray covers, each of the slide output trays adjacent to a respective one of the slide output tray covers forming a plurality of voids between the slide output tray and the slide output tray cover for receiving slides therein, wherein the plurality of slide output trays and slide output tray covers are provided in a stacked arrangement forming a plurality of steps, and wherein each of the plurality of slide output tray covers comprises a first side with a fluid inlet in communication with one of the plurality of voids, and a second side configured to form a hydration chamber with a slide in one of the plurality of voids to maintain hydration of the slide with fluid received from the fluid inlet for a designated time following treatment of the slide by the automated treatment apparatus, the automated treatment apparatus inputting fluid to the slide in the void via the fluid inlet.

\* \* \* \* \*